United States Patent
Joseph et al.

(10) Patent No.: US 7,428,991 B2
(45) Date of Patent: Sep. 30, 2008

(54) 1-D BARCODE DECODING WITH 2-D SENSOR ARRAY

(75) Inventors: Eugene Joseph, Coram, NY (US);
Bradley Carlson, Huntington, NY (US);
Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 261 days.

(21) Appl. No.: 11/262,606

(22) Filed: Oct. 31, 2005

(65) Prior Publication Data

US 2007/0095916 A1 May 3, 2007

(51) Int. Cl.
*G06K 7/00* (2006.01)
(52) U.S. Cl. ............. 235/440; 235/462.01; 235/462.09; 235/462.17; 235/462.2; 235/447

(58) Field of Classification Search ................. 235/440, 235/462.01, 462.09, 462.17, 462.2, 462.32, 235/462.42, 462.1, 447
See application file for complete search history.

(56) References Cited

U.S. PATENT DOCUMENTS

| 6,062,475 | A  | * | 5/2000 | Feng | 235/462.06 |
| 6,340,114 | B1 | * | 1/2002 | Correa et al. | 235/462.22 |
| 6,637,658 | B2 | * | 10/2003 | Barber et al. | 235/462.45 |
| 2003/0189099 | A1 | * | 10/2003 | Carlson et al. | 235/454 |
| 2004/0118919 | A1 | * | 6/2004 | Breytman et al. | 235/454 |
| 2005/0056699 | A1 | * | 3/2005 | Meier et al. | 235/454 |

* cited by examiner

*Primary Examiner*—Michael G. Lee
*Assistant Examiner*—Kristy A Haupt
(74) *Attorney, Agent, or Firm*—Tarolli, Sundheim, Covell & Tummino LLP

(57) ABSTRACT

A scanner with a two dimensional array of sensors generates an aiming pattern that is concurrently used as illumination for a segment of the array. In this manner, one-dimensional and simple two-dimensional barcodes can be quickly processed by loading and decoding only the segment of the array.

12 Claims, 3 Drawing Sheets

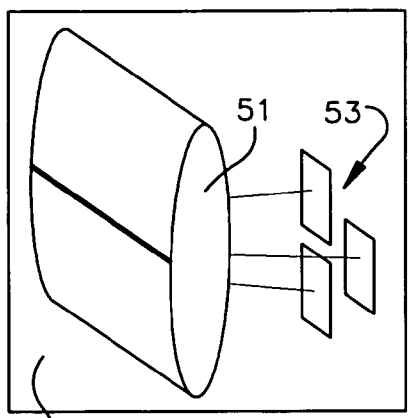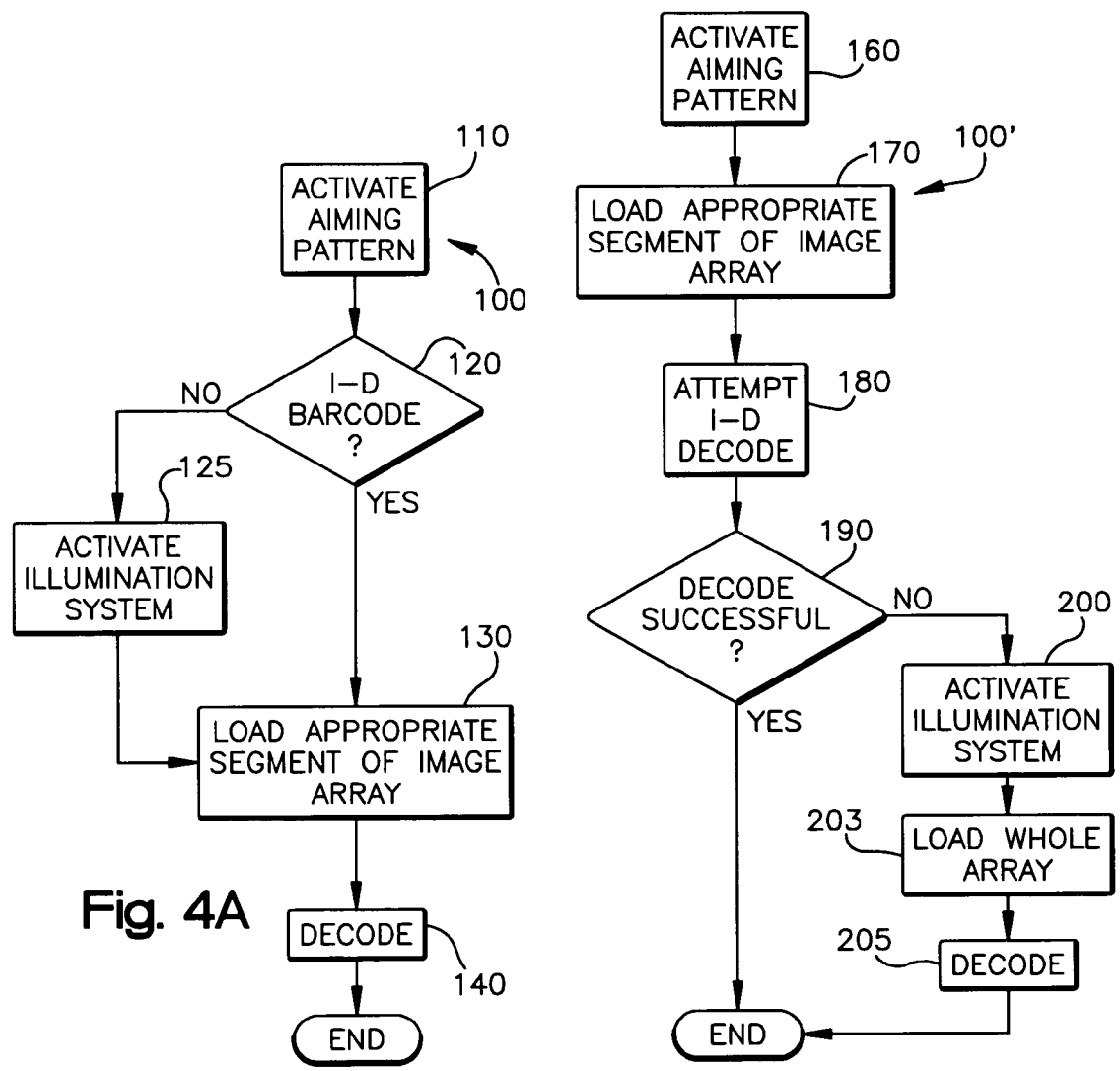

1-D BARCODE DECODING WITH 2-D SENSOR ARRAY

TECHNICAL FIELD

The present invention relates generally to the field of scanners and more particularly to the field of imaging scanners that utilize an aiming pattern to guide the operator in aligning the target object with the scanner.

BACKGROUND

Imaging scanners, or "imagers," are increasingly replacing the laser scanner for many uses. This is because the imagers offer more features than laser scanners such as the ability to read two-dimensional barcodes and capturing images such as checks and identification documents. However, when processing one-dimensional barcodes, a laser scanner can often outperform an imager, especially a high-resolution imager. This is because of the additional time required for the imager to capture and process an entire image. In addition, the power required to illuminate the entire barcode surface so that an image can be captured limits the range of an imager to less than that of many laser scanners.

A typical two-dimensional barcode imaging scanner has an aiming pattern generator for the user to aim the scanner at the target and a separate illuminating system for illuminating the entire two-dimensional field of view. One common aiming pattern is a line that the user aligns so that it cuts through the entire barcode approximately perpendicular to the bars of the barcode. A two-dimensional barcode imaging scanner with separate pattern generating components and image illumination is described in U.S. patent application Ser. No. 11/227,649 filed Sep. 15, 2005, assigned to the assignee of the present invention, and incorporated herein by reference in its entirety.

SUMMARY

A scanner with a two dimensional array of sensors generates an aiming pattern that is concurrently used as illumination for a segment of the array. In this manner, one-dimensional and simple two-dimensional barcodes can be quickly processed by loading and decoding only the segment of the array.

Accordingly, a scanner that processes an indicia that is present on a target surface includes a two dimensional array of light sensors. The scanner illuminates a portion of the indicia with an aiming pattern. Data indicative of an image reflected back from the portion of the indicia is collected in a segment of the two dimensional array of light sensors. A determination is made as to whether the data is sufficient to decode the indicia, and the indicia is decoded if the data is sufficient. If the data is insufficient, substantially the entire indicia is illuminated and data indicative of an amount of light reflected back from the indicia is collected in the whole two dimensional array of light sensors.

The determination as to whether the data is sufficient to decode the indicia can be made by attempting to decode the indicia or by recognizing characteristics of the indicia that would indicate it can be decoded based on the collected data. The aiming pattern can be generated by one or more LEDs whose light passes through a focusing lens or by a laser acting on an optical element that forms the aiming pattern. It may be advantageous to make the horizontal line of a thickness enough to sufficient to cover speckle noise that would be collected the segment of the two-dimensional array.

These and other objects, advantages, and features of the exemplary embodiment of the invention are described in detail in conjunction with the accompanying drawings.

BRIEF DESCRIPTION OF DRAWINGS

FIG. 3 is a schematic view of imaging scanner components that generate an aiming pattern for an imaging scanner constructed according to an embodiment of the present invention;

FIGS. 4A and 4B are flowcharts illustrating two methods of operating an imaging scanner according to embodiments of the present invention'

DETAILED DESCRIPTION

Figure 1:
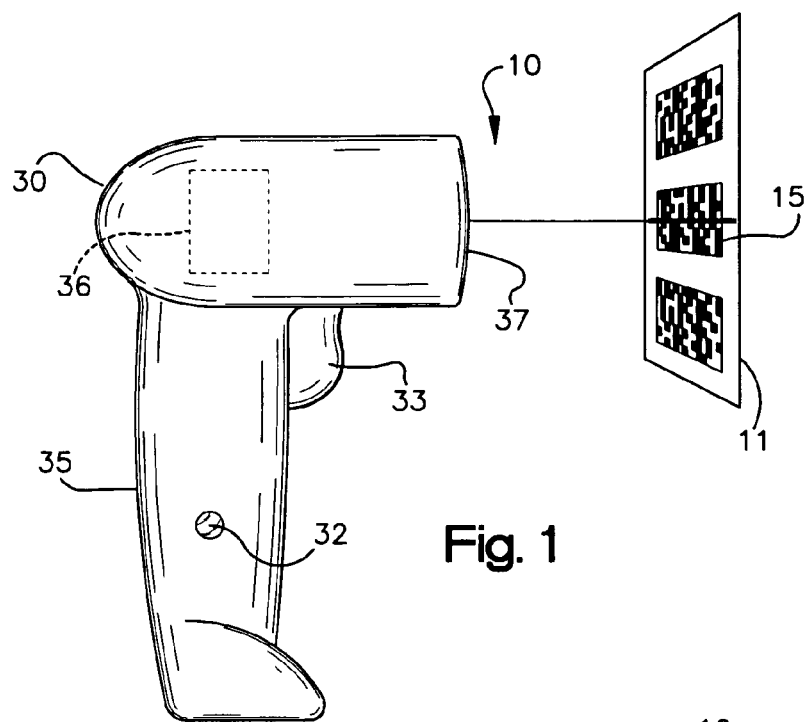
FIG. 1 is a side view of a handheld imaging scanner acting upon a two-dimensional barcode.

FIG. 1 shows a handheld imaging scanner 10 acting upon a surface 11 having a plurality of two-dimensional barcodes 15. For the purposed of this description, a handheld imaging scanner will be discussed. However, it will be apparent to one of ordinary skill in the art that the techniques and devices described herein can be practiced advantageously with stationary or bi-optic imaging scanners. The handheld imaging scanner 10 includes a housing 30 having a handle portion 35 adapted to be gripped by a user. A scan engine 36 that includes scanner components that perform functions such as imaging, control, and optionally, decoding is mounted within the head of the scanner. A user actuated mode switch 32 is also located on the handle portion.

The imaging scanner emits a focused aiming line 20 that is aimed by the user at the particular barcode 15 that is presently being read. The aiming pattern can be activated by a trigger 33, followed by full-scale illumination of the target area. Alternatively, the aiming pattern can be active at all times in which case the trigger 33 activates full-scale illumination of the target. The light emitted from the scanner exits the scanner through a window 37 and light reflected back from the target surface passes through the window to imaging components within the scanner. A fuller description of one aiming pattern activation system can be found in U.S. patent application Ser. No. 11/227,649, referenced in the Background.

Figure 2:
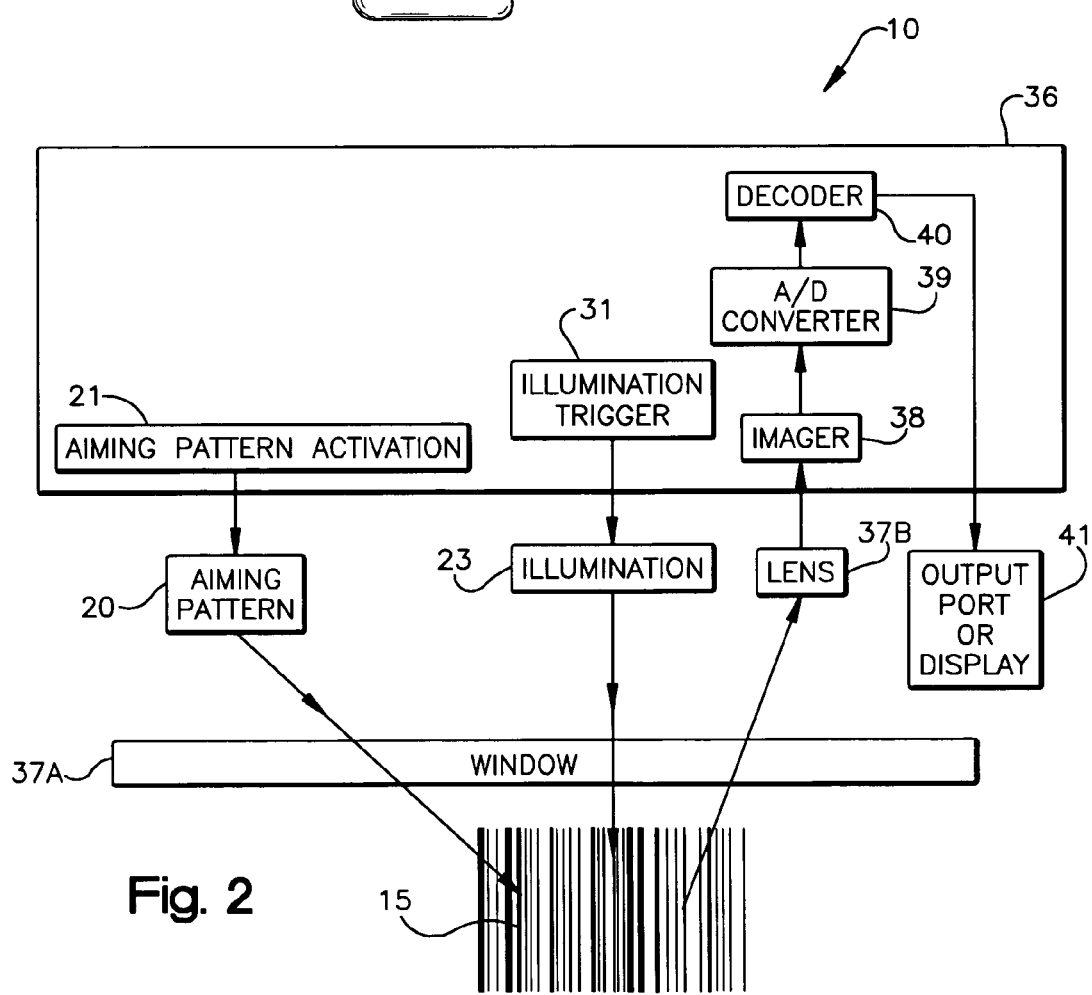
FIG. 2 is a functional block diagram of an imaging scanner constructed in accordance with an embodiment of the present invention.

FIG. 2 is a functional block diagram of an imaging scanner that generates an aiming line that can be used concurrently as illumination for reading a one-dimensional or simple two-dimensional barcodes. The scan engine 36 includes an imager 38 having a two-dimensional array of sensors such as CCD or CMOS sensors that sense light reflected back from the target surface and form pixel data corresponding to an image of the target. It is advantageous to use an array sensor that has the capability to output a portion of pixels upon request, so that the transfer time and processing time can be shortened when only a portion of the array is properly exposed. One such sensor is a CMOS array made by Micron having part number MT9M001. The pixel data from the array is converted into digital data by an A/D converter 39 that is decoded by decoder 40. The A/D converter 39 and decoder 40 are not incorporated in all scan engines and may be housed in separate scanner components. An output port or display 41 provides the results of decoding to a peripheral device (not shown) or displays them to the user. The scanner 10 also includes an illumination source 23 that is capable, within a prescribed scanner range, of illuminating a portion of the target surface sufficient to fill the entire two-dimensional array of sensors with data. The scanner includes an aiming pattern generator 20 that includes an illumination source and a focusing lens (see FIG. 3) that is activated by a user actuated aiming pattern activation device 21.

The aiming pattern generator 20 generates an aiming line (or pattern) that is concurrently used as illumination for a narrow segment of the two-dimensional imaging array when the scanner is being operated in a narrow window scanning, or 1-D, mode. In 1-D mode, the user aligns the aiming/illumination line on the barcode and data from a narrow segment of the two-dimensional array is read out and decoded. For a one-dimensional barcode, data from the narrow segment of the array is sufficient to decode the barcode. If the decode is successful, the full-scale illumination is never activated, saving time and power. Therefore the scanner can decode one-dimensional barcodes much more aggressively than two-dimensional barcodes. The frame read-out time for the narrow segment of the array can be orders of magnitude shorter than the read-out time for the entire array. The amount of light delivered in the aiming/illumination line can be much brighter than that delivered to the entire two-dimensional target area, thus improving the working range of the scanner with respect to one-dimensional barcodes. The scanner can be programmed to switch automatically between 1-D and 2-D modes as will be described in conjunction with FIG. 4, or the user can manually switch between these modes using the mode switch 32 (FIG. 1.)

FIG. 4A is a flowchart outlining a method 100 of operation of the 1-D mode enabled scanner that switches automatically between 1-D and 2-D modes. At 110 the line is activated. Data from the narrow segment of the array corresponding to the illuminated area of the line is examined at 120 to determine if the target is a one-dimensional barcode. The determination of whether the data corresponds to a one-dimensional barcode can be made by any known auto-discrimination routine that searches for image data characteristics that imply a high probability of the presence of a one-dimensional bar-code. If the target is one-dimensional barcode, the narrow segment's data is loaded for decoding at 130 and 140. If the target is not a one-dimensional barcode, the illumination system is activated at 125 and the entire array is loaded for decoding.

FIG. 4B is a flowchart outlining an alternative method 100' of operation of the 1-D enabled scanner that switches automatically between 1-D and 2-D modes. At 160 the aiming pattern is activated and placed on the target. At 170 data from the narrow segment of the array corresponding to illuminated area of the line is loaded and at 180 an attempt is made to decode the data, assuming that it is a one-dimensional barcode. If the decode is not successful at 190, the illumination system is activated at 200 and the whole array is decoded at 203 and 205. Because the process of loading only the narrow segment of the array and decoding the subset of array data can be done so quickly, this alternative method may perform with adequate speed without the need for the auto-discrimination routine.

The ability to operate in 1-D mode can be especially advantageous for high resolution imaging scanners having frame read-out times over 33 milliseconds and can be used with scanners that use color sensors. 1-D mode operation can be provided in camera-enabled mobile phones and mobile computers to minimize power dissipation and improve scanning performance. While the color of the aiming/illumination line is not important for monochrome sensors, it is advantageous to use a white or green line for color sensors. If green light is used with color sensors, then two adjacent rows of the sensor array can be merged to form a full-resolution line across the barcode. If white light is used, then all of the colors of the sensor can be used. 1-D mode can be used with sensors that have a global or rolling electronic shutter, or a mechanical shutter.

Figure 5:
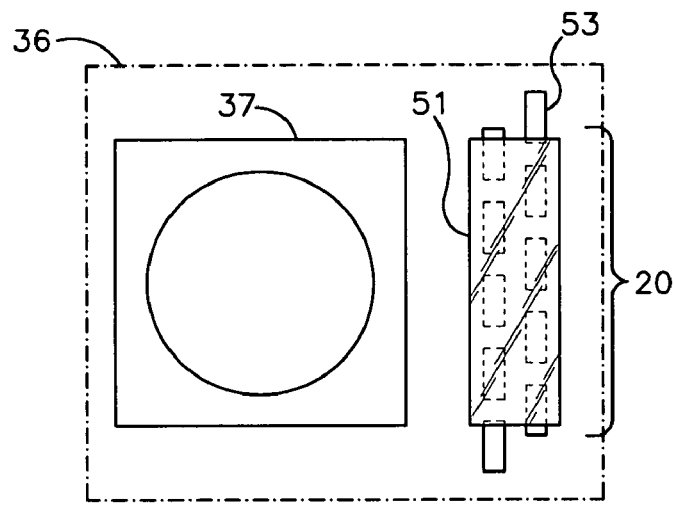
FIG. 5 is a schematic front view of a scan engine having an aiming pattern generator constructed in accordance with an embodiment of the present invention.

FIGS. 3 and 5 illustrate on aiming/illumination line generator 20. A cylindrical lens 51 focuses light output from LEDs 53 into a narrow band. The several LEDs can be turned on individually to narrow the aiming/illumination line or together to widen the line. Staggering the effective areas of the LEDs as shown reduces the likelihood of gaps in the illumination pattern. FIG. 5 shows a scan engine 36 with a camera 37 next to two staggered columns of LEDs 53 behind the lens 51. Depending on the amount of light needed to decode a one-dimensional barcode, more LEDs can be switched on automatically or by the user.

It is also possible to have multiple rows of LEDs for the aiming/illumination line such that if a PDF417 barcode is detected, more rows of LEDs are switched on and the vertical field of view is opened dynamically to read the barcode. The user may switch to a PDF417 mode to activate the additional LEDs or an auto-discrimination function may be used to detect the presence of a PDF417 barcode on the target. Using several lines of LED illumination can improve the depth of field because the illumination can be significantly brighter than full field illumination.

Figure 6:
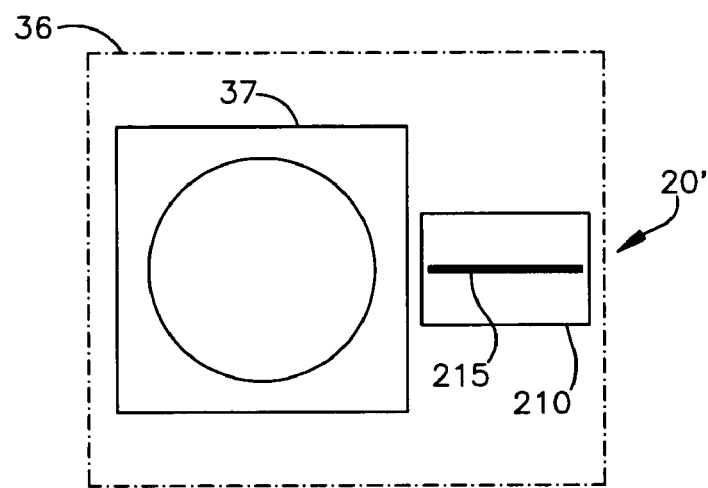
FIG. 6 is a schematic front view of a scan engine having an aiming pattern generator constructed in accordance with an embodiment of the present invention.
Figure 7:
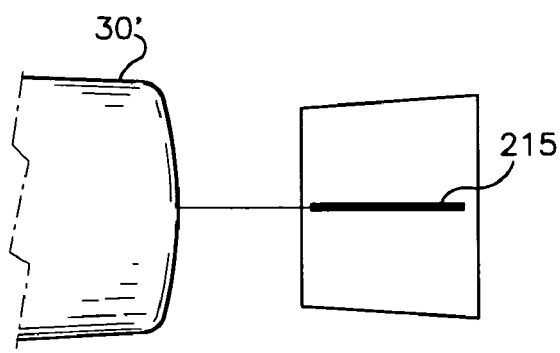
FIG. 7 is a side view of an imaging scanner that includes the aiming pattern generator shown in FIG. 6.

FIGS. 6 and 7 show an alternative embodiment of an aiming pattern generator 20'. A laser (not shown) can be placed behind an optical element 210 to generate an aiming pattern 215 that is bright enough to illuminate a one dimensional barcode for decoding. In one embodiment, the aiming pattern 215 can consist of a horizontal line (FIG. 7). To lessen the effects of "speckle noise" or bright spots in the image that are typically created by a laser, the horizontal line is made relatively thick so that bright light from the aiming pattern more than covers the target area corresponding to the segment of the array that is used for decoding.

It can be seen from the foregoing description that an imaging scanner that can use light from the aiming pattern to decode one-dimensional and simple two-dimensional barcodes can more quickly decode such barcodes and at improved range. Although the invention has been described with a certain degree of particularity, it should be understood that various changes can be made by those skilled in the art without departing from the spirit or scope of the invention as hereinafter claimed.

We claim:

1. A scanner that processes indicia having an indicia area comprising:
    an aiming pattern generator that emits an aiming pattern that illuminates an area corresponding to a target portion of the indicia area, the aiming pattern generator includes a laser and an optical element that forms the aiming pattern, the aiming pattern comprising an illumination line having a thickness exceeding a thickness of the target portion of the indicia area to lessen the effect of any speckle noise present in an image of the target portion of the indicia area;
    an illumination source that illuminates an area corresponding to approximately the entire indicia area;

a two-dimensional array of sensors capable of collecting data corresponding to an image of approximately the entire indicia area;

a segment of the two-dimensional array of sensors capable of collecting data corresponding to the image of the target portion of the indicia area illuminated by the aiming pattern; and wherein the scanner activates the aiming pattern generator to illuminate the target portion of the indicia area; collects data in the segment of the two dimensional array of sensors corresponding to the target portion of the indicia area illuminated by the aiming pattern; and based on the data collected in the segment of the two dimensional array of sensors, determines if the data collected is sufficient to decode the indicia.

2. The scanner of claim 1 wherein the aiming pattern is a line.

3. The scanner of claim 1 comprising a decoder that selectively receives and decodes data from the segment of the two-dimensional array of sensors to process the indicia.

4. The scanner of claim 1 wherein the aiming pattern generator generates one or more additional aiming patterns and wherein the scanner comprises one or more additional segments of the array corresponding to an area illuminated by the one or more additional aiming patterns.

5. The scanner of claim 1 wherein the two dimensional array is adapted such that the segment of the two-dimensional array can be read out in a shorter amount of time than is required to read out the entire two-dimensional array.

6. A scanner that processes indicia having an indicia area comprising:

an aiming pattern generator that emits an aiming pattern that illuminates an area corresponding to a target portion of the indicia area, the aiming pattern generator comprising a plurality of LEDs focused through a focusing lens to form an illumination line, the plurality of LEDs arranged in a plurality of laterally spaced apart rows of LEDs wherein a thickness of the illumination line is determined by a number of rows of the plurality of rows of LEDs activated, the thickness of the illumination line being increased by selectively activating more rows of the plurality of rows of LEDs;

an illumination source that illuminates an area corresponding to approximately the entire indicia area;

a two-dimensional array of sensors capable of collecting data corresponding to an image of approximately the entire indicia area;

a segment of the two-dimensional array of sensors capable of collecting data corresponding to an image of the target portion of the indicia area illuminated by the aiming pattern; and wherein the scanner activates the aiming pattern generator to illuminate the target portion of the indicia area; collects data in the segment of the two dimensional array of sensors corresponding to the target portion of the indicia area illuminated by the aiming pattern; and based on the data collected in the segment of the two dimensional array of sensors, determines if the data collected is sufficient to decode the indicia.

7. The scanner of claim 6 wherein the aiming pattern is a horizontal line.

8. The scanner of claim 6 wherein the LEDs in each row of the plurality of rows of LEDs are staggered with respect to the LEDs in an adjacent row of the plurality of rows of LEDs.

9. The scanner of claim 6 comprising a decoder that selectively receives and decodes data from the segment of the two-dimensional array of sensors to process the indicia.

10. The scanner of claim 6 wherein the aiming pattern is a horizontal line having a relatively large thickness sufficient to cover speckle noise that would be collected in the segment of the two-dimensional array.

11. The scanner of claim 6 wherein the aiming pattern generator generates one or more additional aiming patterns and wherein the scanner comprises one or more additional segments of the array corresponding to an area illuminated by the one or more additional aiming patterns.

12. The scanner of claim 6 wherein the two dimensional array is adapted such that the segment of the two-dimensional array can be read out in a shorter amount of time than is required to read out the entire two-dimensional array.

* * * * *